(12) United States Patent
Engel et al.

(10) Patent No.: US 8,667,859 B2
(45) Date of Patent: Mar. 11, 2014

(54) SHIFTING DEVICE

(75) Inventors: Boris Engel, Mühlacker (DE); Joachim Gansloser, Markgröningen (DE)

(73) Assignee: Daimler AG, Stuttgart (DE)

( * ) Notice: Subject to any disclaimer, the term of this patent is extended or adjusted under 35 U.S.C. 154(b) by 538 days.

(21) Appl. No.: 12/806,676

(22) Filed: Aug. 18, 2010

(65) Prior Publication Data

US 2011/0023647 A1  Feb. 3, 2011

Related U.S. Application Data

(63) Continuation-in-part of application No. PCT/EP2009/001248, filed on Feb. 20, 2009.

(30) Foreign Application Priority Data

Feb. 29, 2008  (DE) .......................... 10 2008 011 898

(51) Int. Cl.
| | | |
|---|---|---|
| *B60K 3/00* | (2006.01) | |
| *B60K 17/10* | (2006.01) | |
| *B60K 20/00* | (2006.01) | |
| *G05G 5/00* | (2006.01) | |

(52) U.S. Cl.
USPC .................................. 74/473.11; 74/473.21

(58) Field of Classification Search
USPC .... 74/6, 7 A, 7 B, 7 C, 7 D, 7 E, 7 R, 473.11, 74/473.21, 473.22, 473.23; 192/219.5
See application file for complete search history.

(56) References Cited

U.S. PATENT DOCUMENTS

| | | | | |
|---|---|---|---|---|
| 3,250,142 A * | 5/1966 | Schuster et al. | ............. | 74/336.5 |
| 5,823,282 A * | 10/1998 | Yamaguchi | .............. | 180/65.235 |
| 6,471,027 B1 * | 10/2002 | Gierer et al. | ................ | 192/219.5 |
| 6,588,294 B1 * | 7/2003 | Rogg | ......................... | 74/473.21 |
| 6,823,976 B2 * | 11/2004 | Schmid | ....................... | 192/219.5 |

FOREIGN PATENT DOCUMENTS

| | | |
|---|---|---|
| DE | 198 34 156 | 2/2000 |
| DE | 10 2006 034 947 | 1/2008 |
| EP | 0 878 366 | 11/1998 |
| EP | 1 136 309 | 9/2001 |
| EP | 1 216 871 | 6/2002 |
| EP | 1 855 033 | 11/2007 |
| JP | 06 174085 | 6/1994 |
| JP | 2008 002344 | 1/2008 |
| WO | 2006/115009 | 11/2006 |

* cited by examiner

*Primary Examiner* — Justin Krause
(74) *Attorney, Agent, or Firm* — K. Bach

(57) ABSTRACT

In a parking position lock shifting device of a motor vehicle including an internal combustion engine, particularly a parking lock shifting device with at least one hydraulic shifting unit, the shifting unit is designed so as to be operable by a drive unit that is operable separately from the internal combustion engine.

10 Claims, 2 Drawing Sheets

SHIFTING DEVICE

This is a Continuation-In-Part application of pending international patent application PCT/EP2009/001248 filed Feb. 20, 2009 and claiming the priority of German patent application 10 2008 011 898.2 filed Feb. 29, 2008.

BACKGROUND OF THE INVENTION

The invention relates to a valve train device.

From DE 198 34 156 A1 is known a generic shifting device of a motor vehicle, namely a park lock shifting device with a hydraulic shifting unit.

It is the principal object of the present invention to provide a shifting device which can be used in a particular flexible manner and which has a high reliability.

SUMMARY OF THE INVENTION

In a parking position lock shifting device of a motor vehicle including an internal combustion engine, particularly a parking lock shifting device with at least one hydraulic shifting unit, the shifting unit is designed so as to be operable by a drive unit that is operable separately from the internal combustion engine.

A "drive unit" is thereby especially meant to be a unit which is provided to provide a drive performance for generating a shifting pressure for a shifting process "designed" means that the shifting unit is designed for a shifting pressure especially by its hydraulic acting surfaces, a provided energy store, as for example a shifting spring and/or by a pressure generating means especially a pump, which shifting pressure can be provided by drive unit independently of the internal combustion engine, wherein a maximum performance of the drive unit is in particular smaller than the one of the internal combustion engine.

An advantageous independence of an internal combustion engine can especially be achieved with the arrangement according to the invention. A shifting process, as a parking lock shifting process should also be possible with a defective or non-activatable internal combustion engine, so that a high reliability for shifting into park position can be ensured.

If the shifting unit is designed for a drive unit formed by a starter generator, additional installation space, weight and costs can be avoided at least to a large extent. The shifting unit is thereby preferably designed in such a manner that a necessary shifting pressure can already be built up at a starter speed of the internal combustion engine. A "starter generator" is especially meant to be in this connection a drive unit which is provided especially for starting an internal combustion engine, that is, especially for cranking an internal combustion engine during a starting process.

The shifting device preferably comprises the drive unit formed separately from the internal combustion engine, which is provided for the supply of a drive performance for generating a shifting pressure necessary for a shifting process of the shifting unit, whereby an advantageous adjustment of the entire unit comprising the shifting unit and the drive unit can be achieved.

In a further arrangement of the invention it is suggested that the drive unit is formed by an electrical machine, whereby this can be integrated in a constructively simple and cost-efficient manner.

If the drive unit has at least one further function in addition to the function of generating of the shifting pressure, which can be realized particularly simple, if the drive unit is formed by an electrical unit, additional components, installation space, weight and costs can be saved. As additional functions it is especially considered to provide a drive performance for generating a coolant volume flow and/or a drive performance for generating a hydraulic pressure with a start-stop operation etc. The electrical drive unit is formed in a particularly advantageous manner by a starter generator, which has the additional function of providing a drive performance for driving an internal combustion engine during a starting process.

In a further embodiment of the invention, the shifting unit has a locking unit, preferably with at least two locking positions, whereby undesired shift movements are avoided at least to a large extent in a constructively simple manner. "Locking positions" in this connection are different shift positions, in which a locking is present.

If the locking unit can be overridden by means of the shifting unit in at least one shifting direction, an operation can also be ensured even with a defective locking unit. The locking unit can thereby preferably be overridden only in a single shifting direction by means of the shifting unit, namely in a particularly advantageous manner for engaging a parking position, whereby the shifting to a shifting position and the holding of this shifting position, preferably the parking position, can securely be achieved.

In a further embodiment of the invention, the shifting unit includes a double-acting hydraulic actuator, whereby a shifting process can preferably be initiated in two directions and a high functional safety can be achieved thereby.

Preferably, the shifting unit comprises a hydraulic actuator, which has at least two separate pressure surfaces oriented in at least one shifting direction. "Separated" shall thereby especially mean that the pressure surfaces are arranged in a spatially separated manner with a free space therebetween. A high shifting force can advantageously be achieved by such an arrangement.

If the shifting device has a control unit which is provided to shift at least one valve automatically, an increased shifting safety can be achieved, especially if the control unit is provided to activate the valve prior to a shifting process and especially prior to a starting process of an internal combustion engine, so that the valve can be deactivated by an operator with a subsequent shifting process, especially a disengagement of a parking position.

The invention will become more readily apparent from the following description of a particular embodiment on the basis of the accompanying drawings.

DESCRIPTION OF A PARTICULAR EMBODIMENT

Figure 1:
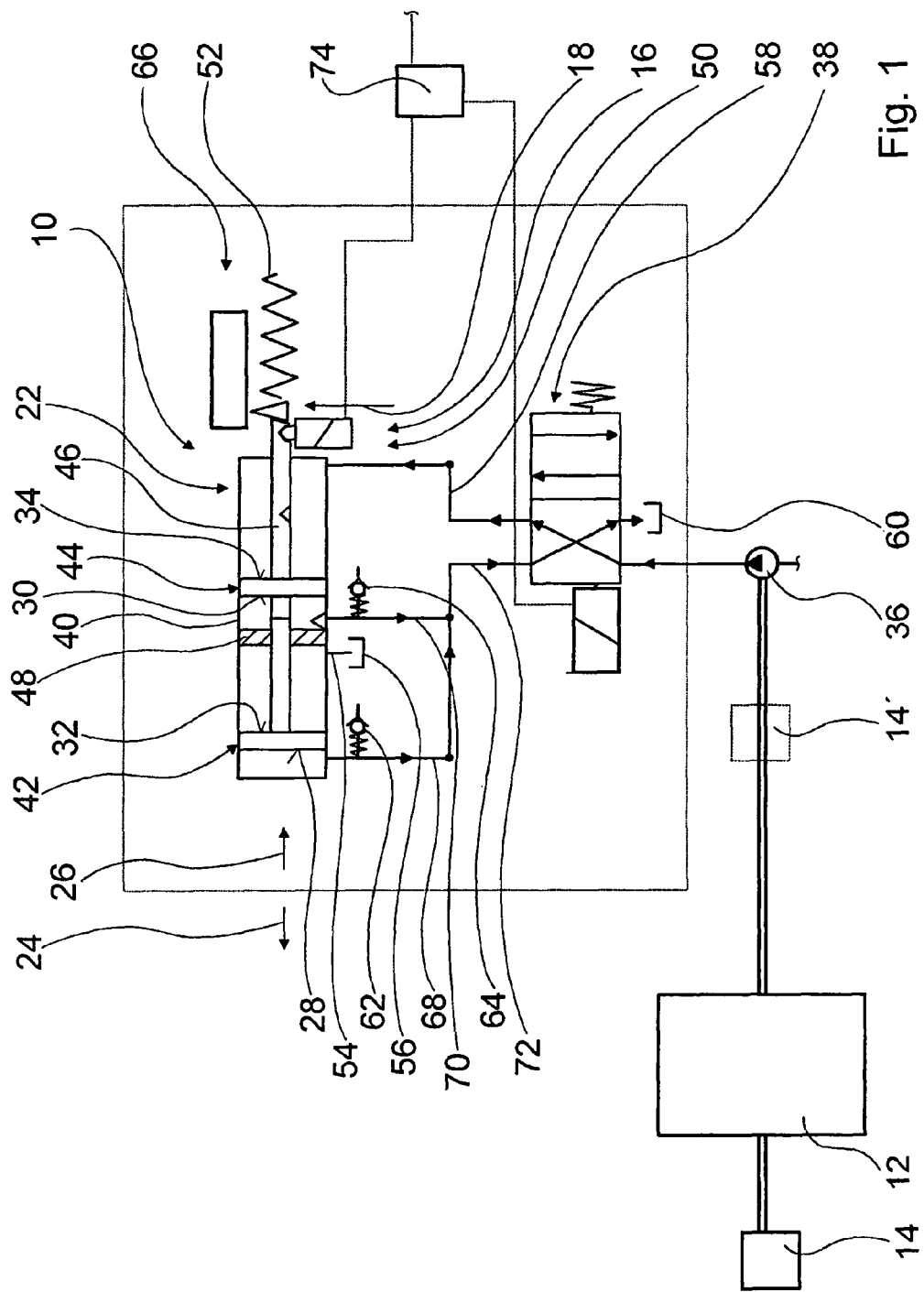
FIG. 1 shows schematically a motor vehicle device shown with an internal combustion engine and a shifting device in a first shifting position and FIG. 2 shows the motor vehicle device of FIG. 1 with the shifting device in a second shifting position.

FIG. 1 shows schematically a motor vehicle device shown with an internal combustion engine 12 and with a shifting device according to the invention in the form of a shift by wire system, namely a parking lock shifting device, which has a hydraulic shifting unit 10. A drive unit 14 of the shifting device is formed separately from the internal combustion engine 12. The drive unit 14 of the shifting device is formed by an electrical machine, namely by a starter/generator, which is provided to rotate the internal combustion engine with a starter process thereof and which additionally provides a drive performance for generating a shifting pressure necessary for a shifting process of the shifting unit 10. The drive unit 14 is thereby connected to a pump 36 of the shifting unit 10 via the internal combustion engine 12 so as to be driven thereby, whereby standard components can advantageously be used. It would basically also be conceivable that the drive unit 14 is coupled directly to the internal combustion engine 12 and directly to the pump 36, as is indicated in a dashed manner in FIG. 1. Instead of the pump 36 connected to the internal combustion engine 12, it is also conceivable that a pump is provided alternatively or additionally, which is coupled to the drive unit 14 and which can be decoupled from the internal combustion engine 12, and which is provided to build up a corresponding shifting pressure.

The shifting unit 10 comprises a valve 38 formed by a 4/2 way magnetic valve coupled to the pump 36, and a double-acting hydraulic actuator 22, which respectively has two separate pressure surfaces 28, 30, 32, 34 facing in two shifting directions 24, 26. The actuator 22 has two pistons 42, 44 spaced in the axial direction in an actuator cylinder housing 40, which pistons are fastened to a common piston rod 46 and which are spatially separated by a fixed cylinder intermediate wall 48.

The shifting unit 10 further comprises a locking unit 16 with two locking positions 18, 20, which correspond to two shifting positions, namely with a locking position 18 associated with a parking position and a locking position 20 associated with a drive position. The locking unit 16 comprises a lift gate 50 formed by an electromagnet, which engages locking positions 18, 20 in recesses of the piston rod 46 and fixes these.

FIG. 1 shows the shifting device in a parking position. Prior to a starting process of the internal combustion engine 12, the valve 38 is automatically activated by a control unit 74, so that it is displaced by means of its electromagnet against a spring force of its valve spring into an end position associated with the parking position (FIG. 1), wherein the lift gate 50 remains deactivated and thus remains in its locking position. The lift gate 50 is designed in such a manner that the parking position can only be disengaged when the lift gate is activated, so that even with a wrongly shifted valve 38, an undesired disengagement of the parking position is prevented.

Figure 2:
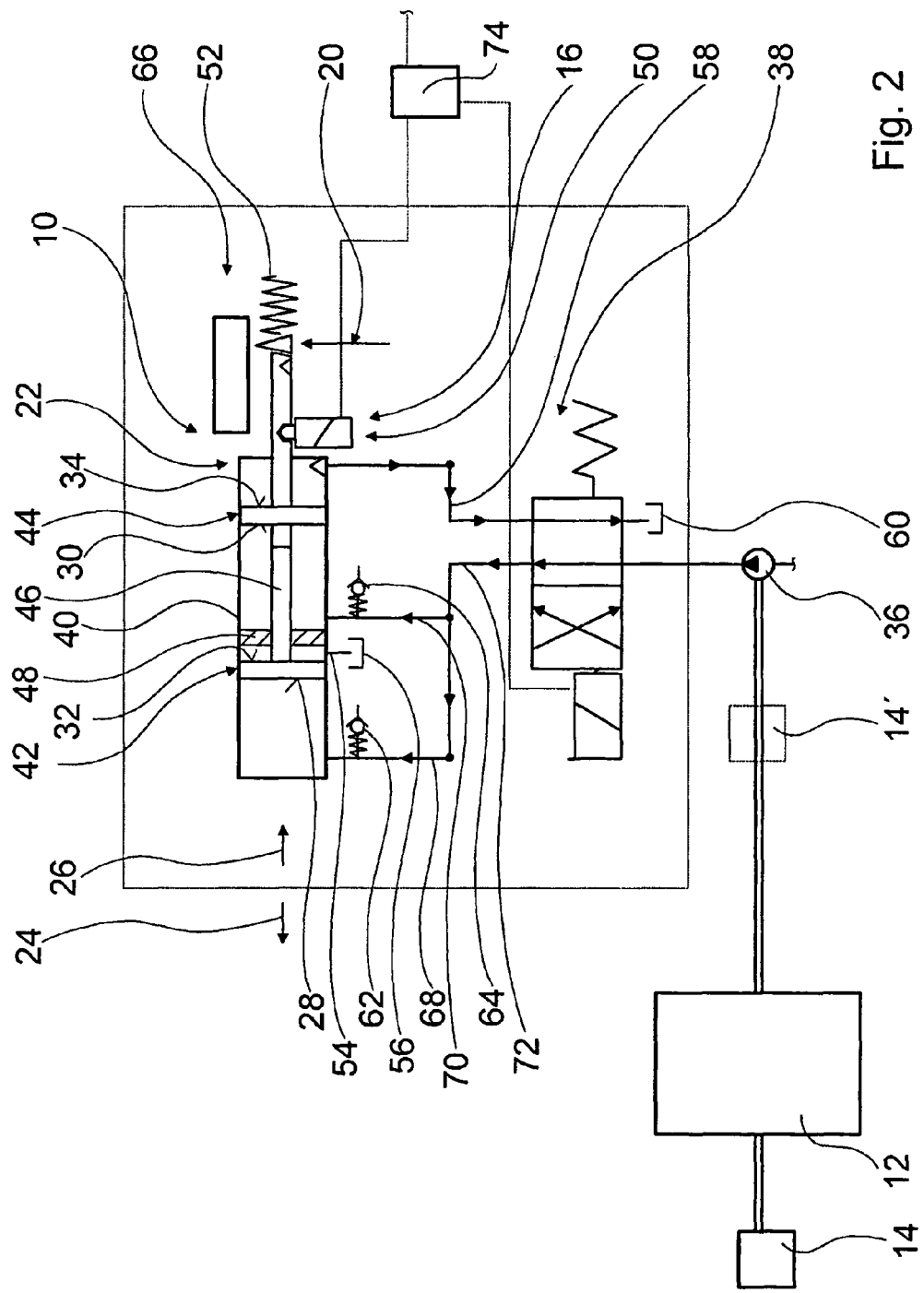

During the starting process of the internal combustion engine 12, it is rotated by the drive unit 14 at about 200 to 300 rpm. Additionally, the pump 36 is operated by the drive unit 14, wherein a drive performance already brought about alone by the drive unit 14 is sufficient during a starting process of the internal combustion engine 12, to build up a sufficient oil pressure by means of the pump 36. In order to shift the shifting device from its parking position into its drive position (FIG. 2) The shifting device can thereby also be shifted with an internal combustion engine 12 which is not capable of starting.

During the shifting process or when engaging the parking position, the valve 38 and the lift gate 50 are accessed electrically by an operator, that is, the electromagnet of the valve is activated, so that the valve 38 is displaced from its end position (FIG. 1) into the other end position (FIG. 2) associated with the drive position by means of the spring force of its valve spring and the lift gate 50 is temporarily displaced from its locking position into its release position and releases the piston rod 46. In the other end position of the valve 38 associated with the drive position, hydraulic fluid is conducted into the pressure chambers facing the pressure surfaces 28, 30 of the piston 42, 44, so that the pistons 42, 44 are displaced from their parking position to their drive position together with the piston rod 46 against the spring force of the actuating spring 52 in the shifting direction 26. A corresponding displacement is thereby sensed by means of a position sensor unit 66. Hydraulic fluid in a pressure chamber facing the pressure surface 32 flows into a tank 56 via a line 54 with a corresponding displacement of the pistons 42, 44 and hydraulic fluid in a pressure chamber facing the pressure surface 34 flows into a tank 60 via a line 58 and via the valve 38. In order to ensure that the pressure chambers facing the pressure surfaces 28, 30 advantageously remain filled with hydraulic fluid, they are connected to a tank, not shown in detail, via two return valves 62, 64.

The piston rod 46 is connected to a latch, not shown in detail, which is released into its drive position during a displacement of the pistons 42, 44 and the piston rod 46. In the drive position, the lift gate 50 engages the recess of the piston rod 46 associated with the parking position and secures the shifting device in its drive position. Concrete drive positions R, N, D are adjusted by a piston cylinder unit, not shown in detail.

When engaging the parking position, the valve 38 and the lift gate 50 are accessed electrically by an operator, namely the electromagnet of the valve 38 is activated, so that the valve 38 is displaced against the spring force of its valve spring from its end position (FIG. 2) associated with the drive position into its end position (FIG. 1) associated with the parking position, and the lift gate is temporarily moved from its locking position into its end position and releases the piston rod. In the end position of the valve 38 associated with the parking position, hydraulic fluid is directed into the pressure chamber facing the pressure surface 34 of the piston 44, so that the pistons 42, 44 are displaced from their drive position to their parking position together with the piston rod 46 engaged by the spring force of the actuating spring 52 into the shifting direction 24. If no hydraulic pressure is present, but the lift gate is shifted, the pistons 42, 44 are displaced together with the piston rod 46 only by the spring force of the actuating spring 52 into its parking position.

The locking unit 16 is designed in such a manner that with a defective lift gate 50 it can be overridden hydraulically in order to engage the parking position. Overcoming the locking unit 16 only by the spring force of the actuating spring 52 is however not possible.

Hydraulic fluid in the pressure chambers facing the pressure surfaces 28, 30 flows into the tank 60 with a corresponding displacement of the pistons 42, 44 via lines 68, 70, 72 and via the valve 38.

When engaging the parking position, the catch connected to the piston rod 46 is moved into its locking position. In the parking position, the lift gate 50 engages the recess of the piston rod 46 associated with the parking position and secures the shifting device in its parking position.

In order to always ensure an accessing of the locking unit 16 or of the lift gate 50 and of the valve 38, a separate current source in the form of an additional battery is provided to achieve a high security that the parking position can be engaged.

What is claimed is:
1. A parking position lock shifting device of a motor vehicle having a hydraulic shifting unit (10), designed to be operable by a hydraulic fluid at a shifting pressure generated by a drive unit (14) that is operable separately from an internal combustion engine (12) of the motor vehicle, the shifting unit (10) having a hydraulic actuator (22) with a piston rod (46) having two locking positions (18, 20) and a locking unit (16), comprising:
an electromagnetically operated lift gate (50) for engaging in either of the two locking positions (18, 20) of the piston rod (46) for locking the hydraulic actuator (22), one of the locking positions (20) being associated with a drive position and the other locking position (18) being associated with a parking position, the piston rod (46) being biased by a spring (52) toward the parking position, so as to permit movement of the piston rod into the parking position even when no hydraulic fluid pressure is available, the lift gate locking unit (16) being designed so that it can be overcome hydraulically in order to permit shifting into the parking position upon failure of the lift gate (50) when sufficient hydraulic operating is available.

2. The parking lock shifting device according to claim 1, wherein the shifting unit (10) is designed for a drive unit (14) formed by a starter/generator capable to rotate the internal combustion engine and, together therewith, a hydraulic fluid pump (36) at a speed to generate a hydraulic operating pressure sufficient to overcome a locking force of the lift gate locking unit (16).

3. The parking lock shifting device according to claim 1, wherein the drive unit (14) is formed separately from the internal combustion engine (12), and has a drive performance sufficient for generating a shifting pressure necessary for a shifting process of the shifting unit (10).

4. The parking lock shifting device according to claim 3, wherein the drive unit (14) is formed by an electrical machine.

5. The parking lock shifting device according to claim 4, wherein the electrical drive unit (14) is a starter/generator.

6. The parking lock shifting device according to claim 3, wherein the drive unit (14) has at least one further function in addition to the function of generating the shifting pressure.

7. The parking lock shifting device according to claim 1, wherein the two locking positions (18, 20) are formed by recesses in the piston rod (46) which are engaged by the locking unit (16).

8. The parking lock shifting device according to claim 1, wherein the shifting unit (10) has a double-acting hydraulic actuator (22).

9. The parking lock shifting device according to claim 1, wherein the shifting unit (10) comprises a hydraulic actuator (22), which has in of least one shifting direction (24, 26) at least two separate pressure surfaces (28, 30, 32, 34).

10. The parking lock shifting device according to claim 1, wherein a control unit (74) is provided for shifting at least one valve (38) in an automatic manner.

\* \* \* \* \*